Patented Jan. 17, 1933

1,894,330

UNITED STATES PATENT OFFICE

RICHARD TOBLER, OF RIEHEN, NEAR BASEL, AND WALTER KERN, OF SISSACH, SWITZERLAND, ASSIGNORS TO THE FIRM OF SOCIETY OF CHEMICAL INDUSTRY IN BASLE, OF BASEL, SWITZERLAND

MANUFACTURE OF 1-AMINO-2-ALKOXYNAPHTHALENES

No Drawing. Application filed January 25, 1932, Serial No. 588,812, and in Switzerland February 9, 1931.

This invention relates to the manufacture of 1-amino-2-alkoxynaphthalene by causing a 1-halogen-2-alkoxynaphthalene to react at raised temperature with an agent that yields ammonia, advantageously in presence of a substance which facilitates the exchange of the halogen.

Suitable 1-halogen-2-alkoxynaphthalenes are, for instance, 1-chloro-2-methoxynaphthalene, 1-bromo-2-methoxynaphthalene; also the corresponding O-ethylated or O-propylated compounds.

Substances which facilitate the exchange of halogen are, in particular, finely divided copper and its compounds, such as for instance copper hydroxide, copper sulfate, and zinc chloride.

In many cases it is of advantage to add to the mixture undergoing reaction an organic solvent, such as methyl-or ethyl-alcohol, or pyridine, which is capable of dissolving the 1-halogen-2-alkoxynaphthalene.

The temperature at which the reaction is to occur may vary within wide limits. Generally speaking, when 1-chloro-2-alkoxynaphthalene is used, the temperature selected must be higher than when the corresponding bromo-derivative is used; the latter reacts when heated with ammonia in an autoclave already at temperatures from about 110–120°.

As agents yielding ammonia there come into consideration for instance ordinary aqueous ammonia, urea, ammonium chloride, ammonium carbonate, ammonium bicarbonate, zinc chloride-ammonia; very good yields are obtained, for example, with an aqueous solution of ammonia of as high a strength as possible in presence of finely divided copper and a little alcohol. When copper is used as the agent for facilitating the exchange of the halogen there are formed, owing to the reducing action of the copper and according to the proportion of added copper, to the duration of the reaction and to the temperature of the reaction, besides the 1-amino-2-alkoxynaphthalene, a smaller or larger quantity of 2-alkoxynaphthalene, which may be isolated, halogenated and further caused to react with ammonia or an agent that yields ammonia.

The following examples illustrate the invention, the parts being by weight:—

Example 1

237 parts of 1-bromo-2-methoxynaphthalene, 3000 parts of ammonia (of 32 per cent. strength) and 10 parts of natural copper C (cf. "Berichte der deutschen chemischen Gesellschaft" volume 29, footnote at pages 1878–79) are charged into an autoclave; for increasing the concentration, ammonia gas is introduced. The internal temperature of the autoclave is now raised to 110–115° C. and kept at this point for 40 hours. After cooling and blowing off the excess of ammonia, the contents of the autoclave are discharged and then mixed with ether and the ethereal layer is separated in a separating funnel. The dried ethereal solution is then saturated with hydrochloric acid gas so that the 1-amino-2-methoxynaphthalene is precipitated substantially quantitatively in the form of hydrochloride. The latter is filtered and dried. In order to obtain the free 1-amino-2-methoxynaphthalene the hydrochloride is dissolved in 6000 parts of water, the solution is filtered from a small quantity of impurities and the free base is precipitated from the solution by addition of ammonia. In this manner a good yield of 1-amino-2-methoxynaphthalene is obtained in the form of colorless needles which melt at 54° C.

Example 2

251 parts of 1-bromo-2-ethoxynaphthalene, 1500 parts of ammonia of 32 per cent. strength, 10 parts of natural copper C and 20 parts of alcohol are charged into an autoclave. For increasing the concentration, ammonia gas is introduced for a period of some minutes; the internal temperature of the autoclave is then raised to 110–115° C., and maintained at that temperature for 50 hours. After cooling and blowing off the excess of ammonia, the contents of the autoclave are discharged and mixed with ether and the ethereal layer is then separated in a separating funnel. Hydrochloric acid gas is led into the dried ethereal solution until the latter is saturated with the gas, whereby 1- amino-2-ethoxynaphthalene is precipitated in the form of the hydrochloride. The latter is filtered and dried. In order to obtain the free 1-amino-2-ethoxynaphthalene the hydrochloride is dissolved in 6000 parts of water, the solution filtered from a small amount of impurities and the base precipitated by addition of ammonia. The 1-amino-2-ethoxynaphthalene thus obtained with good yield may be purified by distillation in a vacuum. It is obtained in the form of pale yellowish needles which melt at 50–51° C.

Instead of copper, other suitable substances may be used, such as zinc chloride or sodium sulphite.

Example 3

237 parts of 1-bromo-2-methoxynaphthalene, 3000 parts of ammonia of 32 per cent. strength, 10 parts of natural copper C and 20 parts of alcohol are charged into an autoclave, and for increasing the concentration ammonia gas is introduced for a period of some minutes. The internal temperature is then raised to 110–115° C. and kept at this temperature for 40 hours. The cooled contents of the autoclave are now filtered, whereby the 1-amino-2-methoxynaphthalene, which is insoluble in ammonia, and a little copper are separated from the solution. This undissolved matter is thoroughly extracted with sulfuric acid of 5 per cent. strength at a temperature of 60–70° C. and the filtrate is made alkaline with ammonia. In this manner the 1-amino-2-methoxynaphthalene is obtained in good yield in the form of a precipitate which can be separated by simple filtration.

Example 4

192.5 parts of 1-chloro-2-methoxynaphthalene, 2000 parts of ammonia of 32 per cent. strength, 100 parts of alcohol and 15 parts of natural copper C are charged into an autoclave; for increasing the concentration ammonia gas is introduced. The autoclave is heated until its internal temperature is 135–140° C., at which it is maintained during 40 hours. After working up as described in Example 1, the 1-amino-2-methoxynaphthalene is obtained in the form of pale yellow needles which melt at 55° C.

Example 5

237 parts of 1-bromo-2-methoxynaphthalene are melted during 9 hours at 180–185° C. together with 300 parts of urea. The cooled mass is dissolved in dilute hydrochloric acid at 60–70° C. and the unchanged 1-bromo-2-methoxynaphthalene is separated by filtration.

The hydrochloric acid solution of 1-amino-2-methoxynaphthalene is then mixed with sodium chloride, whereby the 1-amino-2-methoxynaphthalene-hydrochloride is precipitated in the form of white needles which are separated by filtration.

Example 6

237 parts of 1-bromo-2-methoxynaphthalene, 2200 parts of ammonia of 32 per cent. strength, 460 parts of alcohol saturated with ammonia at 20° C. and 20 parts of natural copper C are charged into an autoclave; for increasing the concentration ammonia gas is led in. The autoclave is then heated until its internal temperature is 110–115° C., which temperature is maintained during 40 hours. After cooling and blowing off excess of ammonia the contents of the autoclave are discharged, filtered and the solid matter washed with water. This solid matter is then mixed with 105 parts of sulfuric acid of 97 per cent. strength and 1250 parts of water, and the whole is subjected to steam distillation. 2-methoxynaphthalene of melting point 72° C. distils owing to the elimination of bromine from the 1-bromo-2-methoxynaphthalene. The residual sulfuric acid solution is now filtered from a little impurity and mixed with 200 parts of concentrated hydrochloric acid, and the solution is then saturated with common salt. The 1-amino-2-methoxynaphthalene-hydrochloride is thus separated in the form of a crystalline precipitate, which may be filtered, washed with concentrated salt solution and dried.

What we claim is:—

1. A process for the manufacture of 1-amino-2-alkoxynaphthalenes, consisting in causing 1-halogen-2-alkoxynaphthalenes to react at raised temperature with agents yielding ammonia.

2. A process for the manufacture of 1-amino-2-alkoxynaphthalenes, consisting in causing 1-halogen-2-alkoxynaphthalenes to react at raised temperature with ammonia.

3. A process for the manufacture of 1-amino-2-alkoxynaphthalenes, consisting in causing 1-halogen-2-alkoxynaphthalenes to react at raised temperature with ammonia, in presence of compounds of copper, and of organic solvents which have a dissolving action on the 1-halogen-2-alkoxynaphthalenes.

4. A process for the manufacture of 1-amino-2-alkoxynaphthalenes, consisting in causing 1-halogen-2-alkoxynaphthalenes to react at raised temperature with ammonia, in presence of finely divided copper, and of organic solvents which have a dissolving action of the 1-halogen-2-alkoxynaphthalenes.

5. A process for the manufacture of 1-amino-2-alkoxynaphthalenes, consisting in causing 1-halogen-2-alkoxynaphthalenes to react at raised temperature with ammonia, in presence of finely divided copper, and of alcohols.

6. A process for the manufacture of 1-amino-2-methoxynaphthalene, consisting in causing 1-halogen-2-methoxynaphthalene to react at raised temperature with ammonia in presence of finely divided copper and of alcohols.

7. A process for the manufacture of 1-amino-2-methoxynaphthalene, consisting in causing 1-bromo-2-methoxynaphthalene to react at raised temperature with ammonia in presence of finely divided copper and of alcohols.

8. A process for the manufacture of 1-amino-2-methoxynaphthalene, consisting in causing 1-bromo-2-methoxynaphthalene to react at raised temperature with ammonia in presence of finely divided copper and of ethylalcohol.

In witness whereof we have hereunto signed our names this 14th day of January, 1932.

RICHARD TOBLER.
WALTER KERN.